(12) United States Patent
Shackelford

(10) Patent No.: US 7,219,204 B2
(45) Date of Patent: May 15, 2007

(54) DYNAMIC, POLICY-BASED CONTROL OF COPY SERVICE PRECEDENCE

(75) Inventor: David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 10/859,009

(22) Filed: Jun. 2, 2004

(65) Prior Publication Data

US 2006/0004889 A1   Jan. 5, 2006

(51) Int. Cl.
*G06F 12/00* (2006.01)
(52) U.S. Cl. ........................ 711/162; 711/112; 711/114
(58) Field of Classification Search ...................... None
See application file for complete search history.

(56) References Cited

U.S. PATENT DOCUMENTS

| | | | |
|---|---|---|---|
| 5,410,667 A | 4/1995 | Belsan et al. | |
| 5,623,669 A | 4/1997 | Kincaid | |
| 5,734,818 A | 3/1998 | Kern et al. | |
| 5,787,247 A | 7/1998 | Norin et al. | |
| 6,058,416 A | 5/2000 | Mukherjee et al. | |
| 6,078,932 A | 6/2000 | Haye et al. | |
| 6,085,276 A | 7/2000 | VanDoren et al. | |
| 6,611,901 B1 | 8/2003 | Micka et al. | |
| 2002/0073277 A1 | 6/2002 | Butterworth et al. | |
| 2002/0143999 A1 | 10/2002 | Yamagami | |
| 2003/0084138 A1 | 5/2003 | Tavis et al. | |

OTHER PUBLICATIONS

IBM Corp. "*z/OS DFSMS Advanced Copy Services. Release 1.*" Apr. 2001. Table of Content (pp. iii-x), Preface (pp. xi-xii)1 Part 1, Chapter 1 (pp. 1-18).

*Primary Examiner*—Reginald Bragdon
*Assistant Examiner*—Ngoc Dinh
(74) *Attorney, Agent, or Firm*—Janaki K. Davda; Konrad Raynes & Victor LLP

(57) ABSTRACT

Techniques are provided for resolving a collision between two copy services. A policy associated with a new copy service request is retrieved. Characteristics of an existing copy service request are determined. The effects of the new copy service request are determined. A resolution for the collision is identified based on the policy, the determined characteristics, and the determined effects.

22 Claims, 4 Drawing Sheets

DYNAMIC, POLICY-BASED CONTROL OF COPY SERVICE PRECEDENCE

BACKGROUND

1. Field

Implementations of the invention relate to dynamic, policy-based control of copy service precedence.

2. Description of the Related Art

Certain disaster recovery systems address data loss over a period of time. In this type of gradual disaster, updates to volumes may be lost. A volume may be described as any logical or physical element of storage. To assist in recovery of data updates, a copy of data may be provided at a remote location. Such dual or shadow copies are typically made as an application program is writing new data to a storage device (e.g., a primary storage device). A storage device is a physical unit that provides a mechanism to store data on a given medium, such that the data can be subsequently retrieved.

There are many types of copy services available today, but some copy services cannot be simultaneously performed on the same data because they lead to inconsistencies in the data.

International Business Machines Corporation (IBM), the assignee of the subject patent application, provides remote copy services for maintaining remote copies of data at a secondary storage device, including extended remote copy (XRC) and peer-to-peer remote copy (PPRC). These systems provide techniques for recovering data updates between a last, safe backup and a system failure. Such data shadowing systems can also provide an additional remote copy for non-recovery purposes, such as local access at a remote site. The IBM XRC and PPRC systems are described further in z/OS V1R1.0 DFSMS Advanced Copy Services (IBM Document Number SC35-0428-00), April 2001, which is available from International Business Machines Corporation.

A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy service is performed to minimize the time during which the target and source volumes are inaccessible.

A number of direct access storage device (DASD) subsystems are capable of performing "instant virtual copy" operations, also referred to as "fast replicate functions." Instant virtual copy services work by modifying metadata such as relationship tables or pointers to treat a source data object as both the original and copy. In response to a host's copy request, the storage subsystem immediately reports creation of the copy without having made any physical copy of the data. Only a "virtual" copy has been created, and the absence of an additional physical copy is completely unknown to the host. Then, data may be physically copied as a background operation.

One such instant virtual copy service is known as a FlashCopy® operation. A FlashCopy® operation involves establishing a logical point-in-time relationship between source and target volumes on the same or different devices. Further details of the FlashCopy® operations are described in the copending and commonly assigned U.S. patent application Ser. No. 09/347,344, (U.S. Pat. No. 6,611,901) filed on Jul. 2, 1999, entitled "Method, System, and Program for Maintaining Electronic Data as of a Point-in-Time", which patent application is incorporated herein by reference in its entirety.

A different fast replicate technique is the "SNAPSHOT" copy services solution disclosed in U.S. Pat. No. 5,410,667 entitled "Data Record Copy System for a Disk Drive Array Data Storage Subsystem," which issued on Apr. 25, 1995, which patent is incorporated herein by reference in its entirety.

In existing implementations of copy services, there are often limitations on the combination of copy services that may be used simultaneously on the same data. For example, a point-in-time copy (e.g., a FlashCopy® or Snapshot) may be not performed when the target of the point-in-time copy is already the source of a remote copy (e.g., XRC, PPRC). This restriction exists because performing the point-in-time copy is an atomic operation from an application program's point of view, but might not be feasible to copy as an atomic unit to the remote copy target devices.

As an example, initially, assume that a PPRC copy service is being performed from source B to target C. Then, a desired operation is to perform a FlashCopy® copy service from source A to target B. Thus, target B is already a source for the PPRC copy service, and would be a target for the FlashCopy® copy service.

A normal technique for dealing with the underlying incompatibility between the copy services is to disallow the second copy service when there is a collision (i.e., when the copy services may not be performed simultaneously). This does not take into account the possibility that the Flash-Copy® copy service is more important or desirable to the end user of the data than the consistency of the remote copy target.

Table A illustrates an example collision table. In Table A, the first column lists new copy services, while the remaining column headings provide an existing copy service. For example, if an XRC copy service is currently using a source, and a new FlashCopy® operation starts to move data such that the source of the XRC copy service becomes a target of the FlashCopy® copy service, an error occurs. Also, if a PPRC operation exists for a source, and a new PPRC operation attempts to move data, such that the source will be a target, the operation may proceed if the hardware supports this option.

TABLE A

|  | XRC source | PPRC Source | FlashCopy ® Source |
|---|---|---|---|
| FlashCopy ® Target | Error | Error | Error |
| PPRC Target | error | OK if hardware supports this option | OK |
| XRC Target | OK | OK | OK |

In some conventional systems, typically the first copy service that is started is allowed to finish, and other copy services for the same data are rejected. In other conventional systems, when a first copy service is in process and a second copy service is started, the second copy service is allowed to start and the first copy service is cancelled. Either of these operations is set as a computer default, and a user is not able to change the default solution.

Therefore, there is a continued need in the art to provide better collision resolution between two or more copy services.

SUMMARY OF THE INVENTION

Provided are an article of manufacture, system, and method for resolving a collision between two copy services. A policy associated with a new copy service request is retrieved. Characteristics of an existing copy service request are determined. The effects of the new copy service request are determined. A resolution for the collision is identified based on the policy, the determined characteristics, and the determined effects.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the invention. It is understood that other implementations may be utilized and structural and operational changes may be made without departing from the scope of implementations of the invention.

In certain implementations of the invention, instead of failing one of two incompatible copy services, a copy function manager is provided that that uses the characteristics of an existing copy service, the effect of a new copy service being attempted, and a system-defined and/or user-specified policy to determine an action to take with respect to the incompatible copy services and to implement the action. In this manner, implementations of the invention provide dynamic, policy-based control of copy service precedence.

Figure 1:
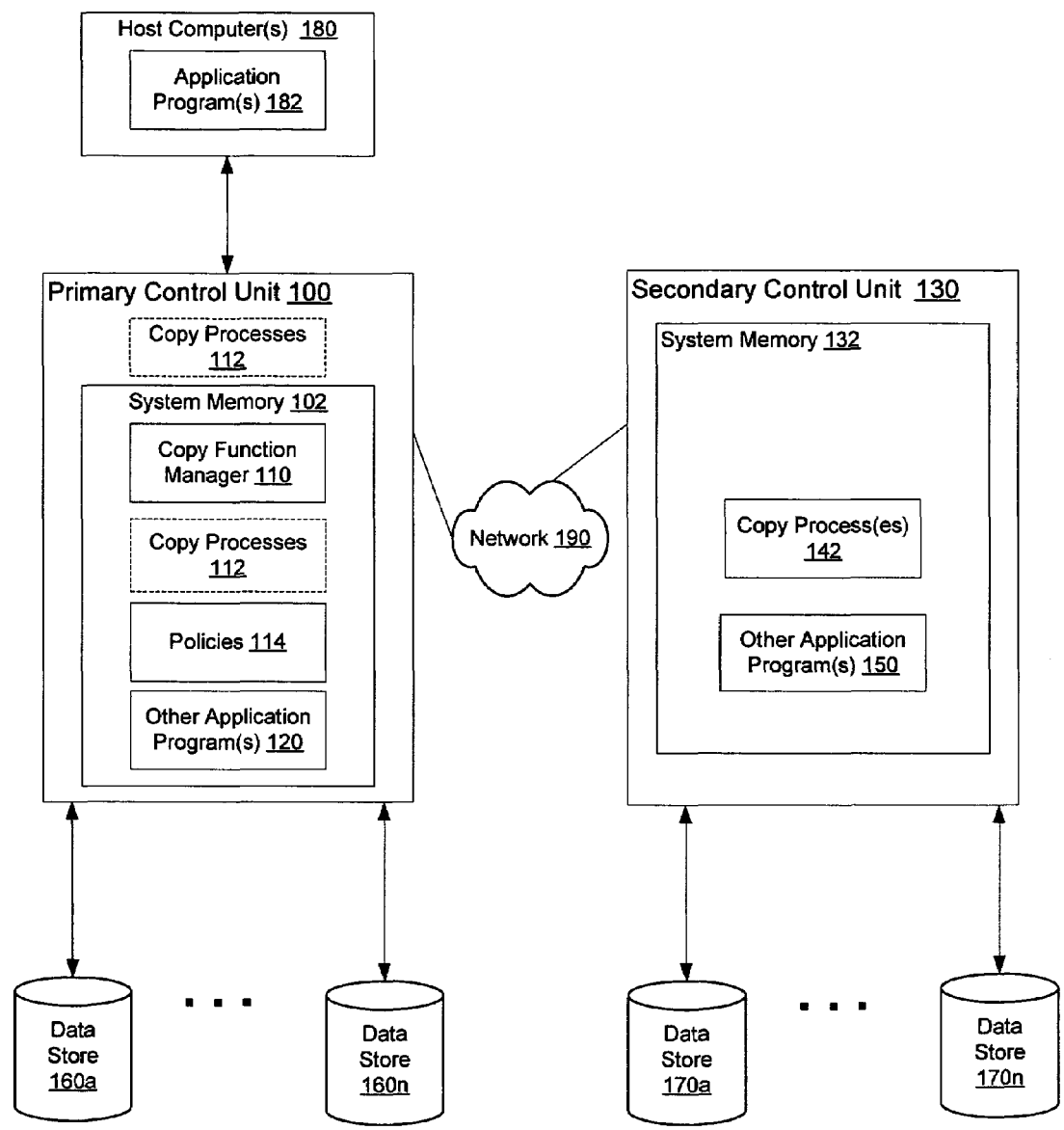
FIG. 1 illustrates a computing environment in accordance with certain implementations of the invention.

FIG. 1 illustrates a computing environment in accordance with certain implementations of the invention. The primary control unit 100 controls the transfer of data between host computers 180 and data stores 160a . . . 160n. Host computers 180 include one or more application programs 182 each that may communicate Input/Output (I/O) requests to the storage space through the control unit. A control unit may also be referred to as a storage controller.

A primary control unit 100 provides one or more host computers 180 access to primary storage represented as data stores 160a . . . 160n, which may be implemented as Direct Access Storage Device (DASD). The primary control unit 100 includes system memory 102. A copy function manager 110 that resolves collisions between copy services executes in system memory 102. Although illustrated as software for convenience, the copy function manager 110 may be implemented as hardware, within an operating system that is performing a copy service, in a backup program performing a copy service, in the fabric of a Storage Area Network (SAN), etc. in alternative implementations of the invention.

Also, copy processes 112 that manage the execution of the copy services (e.g., PPRC, XRC, FlashCopy® and SNAPSHOT copy services) may execute in system memory 102 and/or may be low level functions (e.g., implemented in hardware). The copy processes 112 may be programs that directly invoke copy services or indirectly invoke copy services on behalf of application programs. For example, the copy processes 112 may be invoked by application programs 182 at the host computers 180.

Other application programs 120 (e.g., a read process for reading data from data stores 160a . . . 160n and a write process for writing data to data stores 160a . . . 160n) may execute in system memory 102. Also, policies 114 may be stored in system memory 102 for easy access. The policies 114 may be user-specified and/or system-defined. For example, in certain implementations of the invention, certain policies may be provided as default system-defined policies that may be edited to form user-specified policies. Additionally user-specified policies may be set to be default policies. Alternatively or in addition, the policies 114 may be stored in storage, such as in primary storage 160a . . . 160n, secondary storage 170a . . . 170n or other storage (not shown).

Secondary control unit 130 provides access to secondary storage represented as data stores 170a . . . 170n, which may be implemented as Direct Access Storage Device (DASD). The secondary storage 170a . . . 170n maintain back-up copies of all or a subset of the volumes of the primary storage 160a . . . 160n. The secondary control unit 130 includes system memory 132. Copy processes 142 and other application programs 150 execute in system memory 132.

For example, an application program 182 at a host computer 180 may invoke a PPRC copy service to copy data from data store 160a to 170n. Additionally, another application program 182 at the same or different host computer 180 may invoke a FlashCopy® copy service to copy data from data store 160n to 160a. In this case, data store 160a is a source of one copy service and a target of another copy service. The copy function manager 110 would resolve a collision between the PPRC and FlashCopy® copy services based on one or more policies.

In certain implementations of the invention, removable storage (instead of or in addition to remote storage, such as secondary storage 170a . . . 170n) may be used to maintain back-up copies of all or a subset of the primary storage 160a . . . 160n, and the techniques of the invention transfer data to the removable storage rather than to the remote storage. The removable storage may reside at the primary control unit 100.

In certain implementations of the invention, the primary control unit 100 and secondary control unit 130 may be comprised of the IBM 3990 Model 6 Storage Controller, Enterprise Storage Server®, or any other control unit known in the art.

In certain implementations of the invention, the primary control unit 100 and/or secondary control unit 130 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units and secondary storage.

In certain implementations of the invention, the primary control unit 100 and secondary control unit 130 communicate via a network 190. In certain implementations of the invention, the control units 100, 130 communicate via communication paths, such as direct high speed transmission lines (e.g., an Enterprise System Connection (ESCON®) link. However, the communication paths may be comprised of any other communication means known in the art, including network transmission lines, fiber optic cables, etc.

Figure 2:
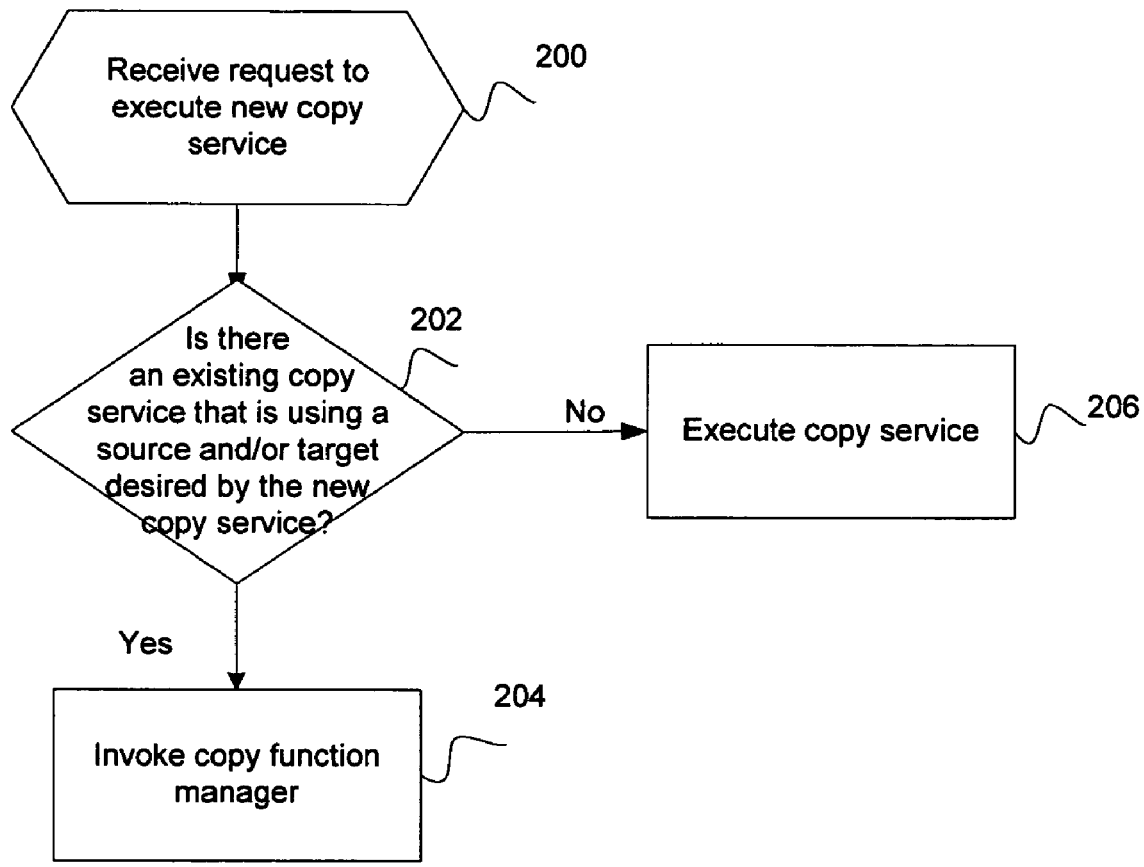
FIG. 2 illustrates logic implemented in a copy process for resolving collisions between copy services in accordance with certain implementations of the invention.

FIG. 2 illustrates logic implemented in a copy process 112 for resolving collisions between copy services in accordance with certain implementations of the invention. Control begins at block 200, with a request to execute a new copy service being received by a copy process 112 from an application program 182. The new copy service specifies a specific copy service (e.g., PPRC, XRC, FlashCopy®, or SNAPSHOT copy service), a source from which data is to be copied, and a target to which data is to be copied. In block 202, the copy process 112 determines whether there is an existing copy service that is using the source and/or target specified by the new copy service. If so, then there is a collision between the existing and the new copy services, and processing continues to block 204, otherwise, there is no collision and processing continues to block 206. In block 206, the copy process 112 invokes the copy function manager 110. In block 206, the copy process 112 allows execution of the new copy service.

Figure 3:
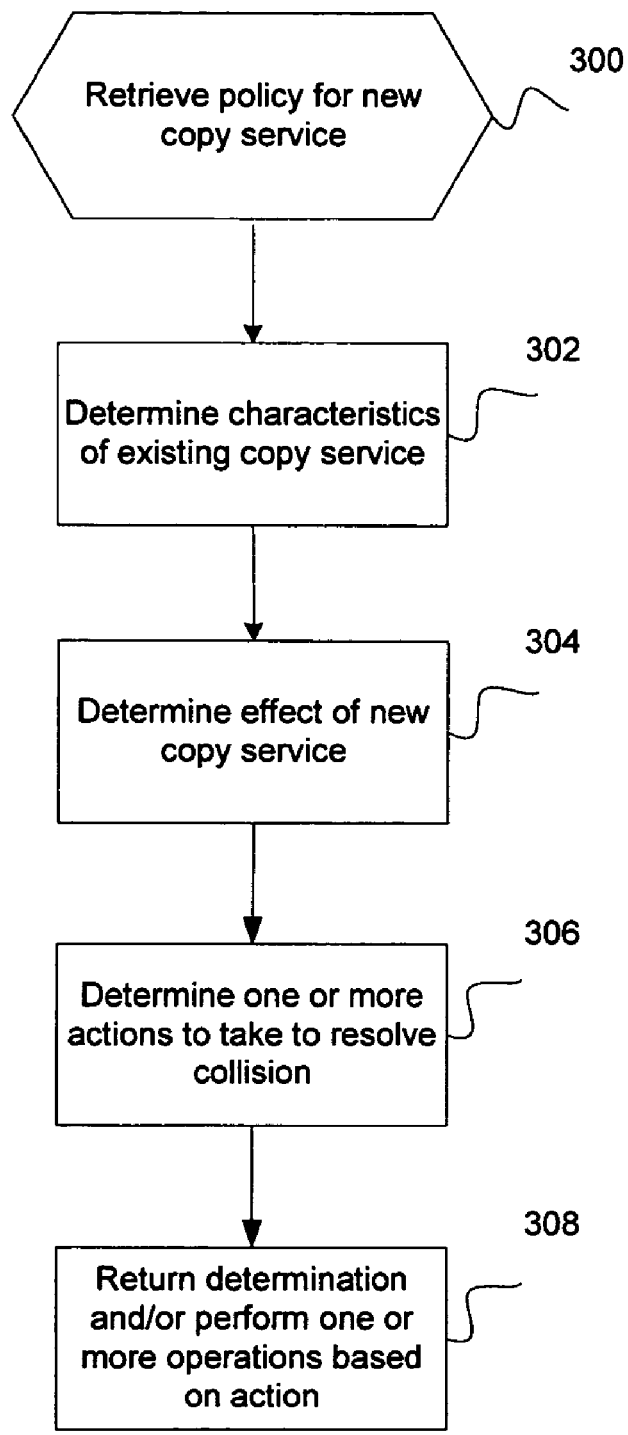
FIG. 3 illustrates logic implemented in a copy function manager for resolving collisions between copy services in accordance with certain implementations of the invention.

FIG. 3 illustrates logic implemented in a copy function manager 110 for resolving collisions between copy services in accordance with certain implementations of the invention. In FIG. 3, the copy function manager 110 has been invoked to resolve a collision between a new and an existing copy service. In certain implementations of the invention, the copy function manager 110 is invoked from a low-level function (e.g., in hardware). In certain alternative implementations of the invention, the copy function manager 110 is invoked by an application program that requested the new copy (e.g., in a backup application program that backs up data from the primary storage 160a . . . 160n to the secondary storage 170a . . . 170n). The invoking hardware/program detects the collision between copy services.

Control begins at block 300 with the copy function manager 110 retrieving a policy 114 associated with the new copy service. In certain alternative implementations of the invention, the policy 114 may also be associated with a user, a group, an application program that invokes the copy service, etc., and then the policy 114 is retrieved based on these other associations in addition to or instead of the association with the new copy service.

The policy 114 is used to dynamically determine precedence of copy services. The policy 114 may be defined with various techniques. For example, one policy may have the following form, in which "application" refers to the application program invoking the new copy service:

when existing copy service=XRC and new copy service=FlashCopy® and application=accounting, reject new copy service when existing copy service=XRC and new copy service=FlashCopy® and application=webserver, allow new copy service and suspend existing copy service The policy may be defined by a user so that the user's preferred interests are served. For example, if a user feels that the FlashCopy® copy service is more important or desirable than the consistency of the remote copy target when the application program invoking the copy services is a web server application program, then the user may specify that the FlashCopy® copy service be allowed to proceed instead of the remote copy (i.e., the XRC copy service).

In block 302, the copy function manager 110 determines characteristics of the existing copy service. For example, the characteristics may include type and state of the existing copy service (e.g., type=XRC, status=suspended or type=PPRC, status=copying 90% complete). In certain implementations of the invention, other characteristics may also be included.

In block 304, the copy function manager 110 determines the effects of the new copy service with reference to the policy 114. For example, the policy 114 may indicate that if recovery time objective for the existing copy service and new copy service will not exceed a predetermined amount of time, then the new copy service can proceed also. In this example, the copy function manager 110 estimates how much time it will take for the new copy service to complete, estimates how much time it will take for the existing copy service to complete (e.g., based on status information), and determines whether both copy services will complete in the predetermined amount of time. If so, both copy services can proceed. If not, the policy 114 would be used to determine a different action.

In block 306, the copy function manager 110 determines one or more actions to take to resolve the collision based on the retrieved policy 114, the characteristics of the existing copy service, and the effects of the new copy service. That is, the copy function manager 110 determines the precedence of the new and existing copy services. For example, one may be allowed to proceed, while the other is terminated or one may be suspended until the other completes.

In block 308, the copy function manager 110 return determination and/or implement one or more operations based on the determined action. That is, the copy function manager 110 takes the new copy service request as input, compares the new copy service request to the characteristics of the existing copy service, evaluates the effects of the new copy service, and, based on a policy, either returns a decision to the invoker of the copy function manager 110 or performs some operations based on the decision. An example of a series of operations that the copy function manager 110 may perform include: suspend remote copy consistently; make a backup copy of the remote copy target volumes; inform invoking hardware/program to perform the point in time copy; receive notification from invoking hardware/program that copy is complete; and restart remote copy. Thus, in this example, the remote copy is suspended to perform the point in time copy, and then the remote copy is restarted. Thus, both copy services are performed.

Thus, in certain implementations of the invention, the characteristics of an existing copy service, the effect of the new copy service being attempted, and a policy 114 are analyzed to determine an action to take and to implement the action. Unlike conventional systems in which the decision of which copy service is to proceed is hardcoded, with implementations of the invention, the copy function manager 110 is invoked when copy services collide and a decision as to how to resolve the collision is made dynamically based on a policy 114 and other information.

FlashCopy, ESCON, and Enterprise Storage Server are registered trademarks or common law marks of International Business Machines Corporation in the United States and/or other countries.

ADDITIONAL IMPLEMENTATION DETAILS

The described embodiments may be implemented as a method, apparatus or article of manufacture using programming and/or engineering techniques to produce software, firmware, hardware, or any combination thereof. The terms "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in a computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The logic of FIGS. 2–3 describes specific operations occurring in a particular order. In alternative implementations of the invention, certain of the logic operations may be performed in a different order, modified or removed. Moreover, operations may be added to the above described logic and still conform to the described implementations of the invention. Further, operations described herein may occur sequentially or certain operations may be processed in parallel, or operations described as performed by a single process may be performed by distributed processes.

The illustrated logic of FIGS. 2–3 may be implemented in software, hardware, programmable and non-programmable gate array logic or in some combination of hardware, software, or gate array logic.

Figure 4:
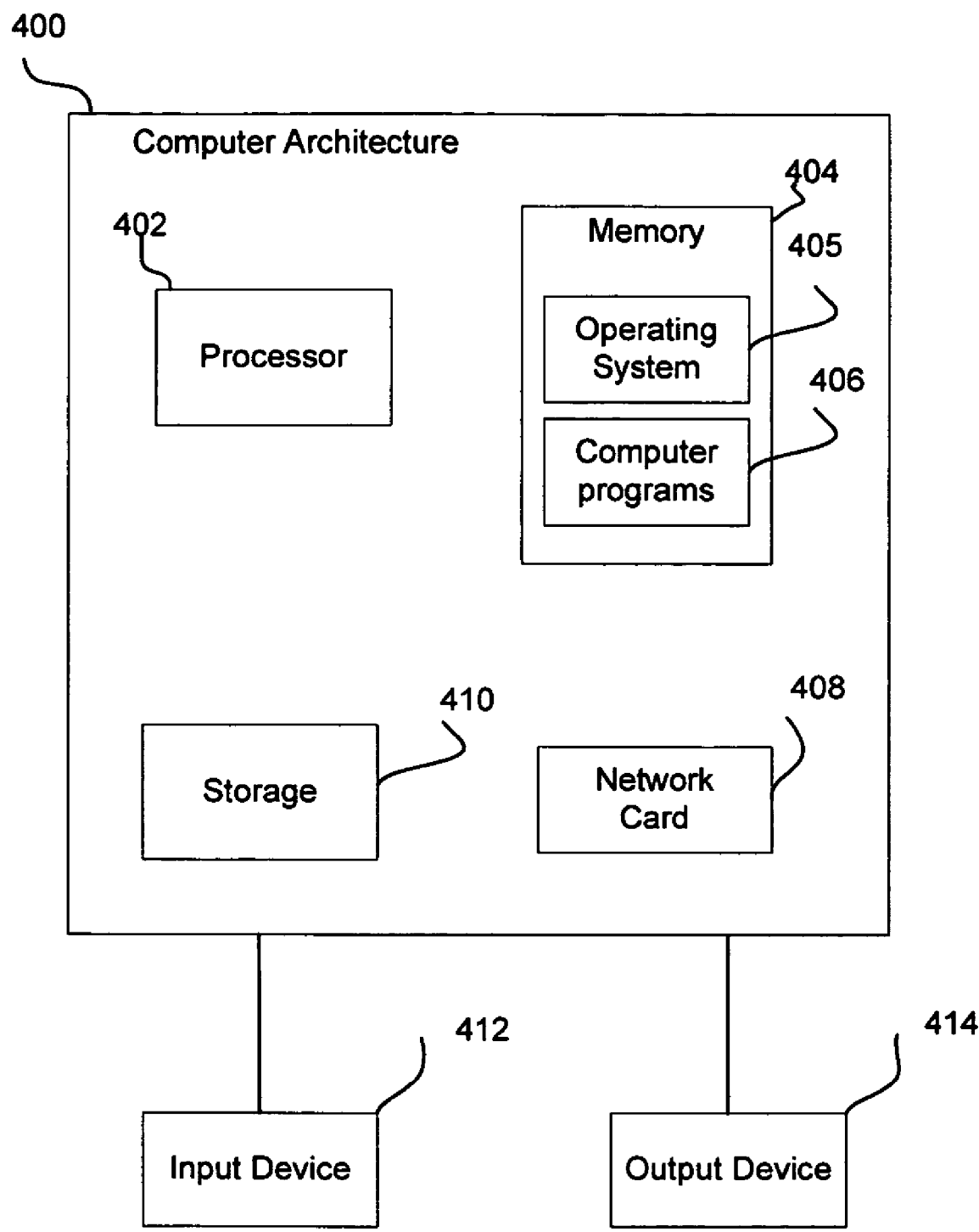
FIG. 4 illustrates an architecture of a computer system that may be used in accordance with certain implementations of the invention.

FIG. 4 illustrates an architecture of a computer system that may be used in accordance with certain implementations of the invention. Hosts 180, primary control unit 110, and/or secondary control unit 130 may implement computer architecture 400. The computer architecture 400 may implement a processor 402 (e.g., a microprocessor), a memory 404 (e.g., a volatile memory device), and storage 410 (e.g., a non-volatile storage area, such as magnetic disk drives, optical disk drives, a tape drive, etc.). An operating system 405 may execute in memory 404. The storage 410 may comprise an internal storage device or an attached or network accessible storage. Computer programs 406 in storage 410 may be loaded into the memory 404 and executed by the processor 402 in a manner known in the art. The architecture further includes a network card 408 to enable communication with a network. An input device 412 is used to provide user input to the processor 402, and may include a keyboard, mouse, pen-stylus, microphone, touch sensitive display screen, or any other activation or input mechanism known in the art. An output device 414 is capable of rendering information from the processor 402, or other component, such as a display monitor, printer, storage, etc. The computer architecture 400 of the computer systems may include fewer components than illustrated, additional components not illustrated herein, or some combination of the components illustrated and additional components.

The computer architecture 400 may comprise any computing device known in the art, such as a mainframe, server, personal computer, workstation, laptop, handheld computer, telephony device, network appliance, virtualization device, storage controller, etc. Any processor 402 and operating system 405 known in the art may be used.

The foregoing description of implementations of the invention has been presented for the purposes of illustration and description. It is not intended to be exhaustive or to limit the implementations of the invention to the precise form disclosed. Many modifications and variations are possible in light of the above teaching. It is intended that the scope of the implementations of the invention be limited not by this detailed description, but rather by the claims appended hereto. The above specification, examples and data provide a complete description of the manufacture and use of the composition of the implementations of the invention. Since many implementations of the invention can be made without departing from the spirit and scope of the implementations of the invention, the implementations of the invention reside in the claims hereinafter appended or any subsequently-filed claims, and their equivalents.

What is claimed is:

1. An article of manufacture embodied as one of hardware logic and a computer readable medium including program logic for resolving a collision between two copy services, wherein the hardware logic or program logic when executed by a computer causes operations to be performed,
the operations comprising:
retrieving a policy associated with a new copy service request;
determining characteristics of an existing copy service request;
determining effects of the new copy service request;
determining a resolution for the collision based on the policy, the determined characteristics, and the determined effects; and
returning an indication of the resolution to one of hardware and a program that requested the resolution.

2. The article of manufacture of claim 1, wherein the policy is user-specified.

3. The article of manufacture of claim 1, wherein the policy is system-defined.

4. The article of manufacture of claim 1, wherein the characteristics include a type of the existing copy service and a status of the existing copy service.

5. The article of manufacture of claim 1, wherein the effects of the new copy service are determined with reference to the policy.

6. The article of manufacture of claim 1, wherein the operations further comprise:
performing one or more operations based on the resolution.

7. The article of manufacture of claim 6, wherein the one or more operations include suspending one of the existing copy service and the new copy service until the other copy service completes.

8. A method for resolving a collision between two copy services, comprises:
retrieving a policy associated with a new copy service request;

determining characteristics of an existing copy service request;

determining effects of the new copy service request;

determining a resolution for the collision based on the policy, the determined characteristics, and the determined effects; and returning an indication of the resolution to one of hardware and a program that requested the resolution.

9. The method of claim 8, wherein the policy is user-specified.

10. The method of claim 8, wherein the policy is system-defined.

11. The method of claim 8, wherein the characteristics include a type of the existing copy service and a status of the existing copy service.

12. The method of claim 8, wherein the effects of the new copy service are determined with reference to the policy.

13. The method of claim 8, further comprising:

performing one or more operations based on the resolution.

14. The method of claim 13, wherein the one or more operations include suspending one of the existing copy service and the new copy service until the other copy service completes.

15. A system for resolving a collision between two copy services, comprising:

circuitry causing operations to be performed, the operations comprising:

retrieving a policy associated with a new copy service request;

determining characteristics of an existing copy service request;

determining effects of the new copy service request;

determining a resolution for the collision based on the policy, the determined characteristics, and the determined effects; and returning an indication of the resolution to one of hardware and a program that requested the resolution.

16. The system of claim 15, wherein the policy is user-specified.

17. The system of claim 15, wherein the policy is system-defined.

18. The system of claim 15, wherein the characteristics include a type of the existing copy service and a status of the existing copy service.

19. The system of claim 15, wherein the effects of the new copy service are determined with reference to the policy.

20. The system of claim 15, wherein the operations further comprise:

performing one or more operations based on the resolution.

21. The system of claim 20, wherein the one or more operations include suspending one of the existing copy service and the new copy service until the other copy service completes.

22. A system comprising:

means for retrieving a policy associated with a new copy service request;

means for determining characteristics of an existing copy service request;

means for determining effects of the new copy service request;

means for determining a resolution for a collision based on the policy, the determined characteristics, and the determined effects; and means for returning an indication of the resolution to one of hardware and a program that requested the resolution.

* * * * *